No. 676,116. Patented June 11, 1901.
F. C. BILLINGS.
STEERING MECHANISM FOR VEHICLES.
(Application filed June 20, 1900.)
(No Model.) 2 Sheets—Sheet 1.
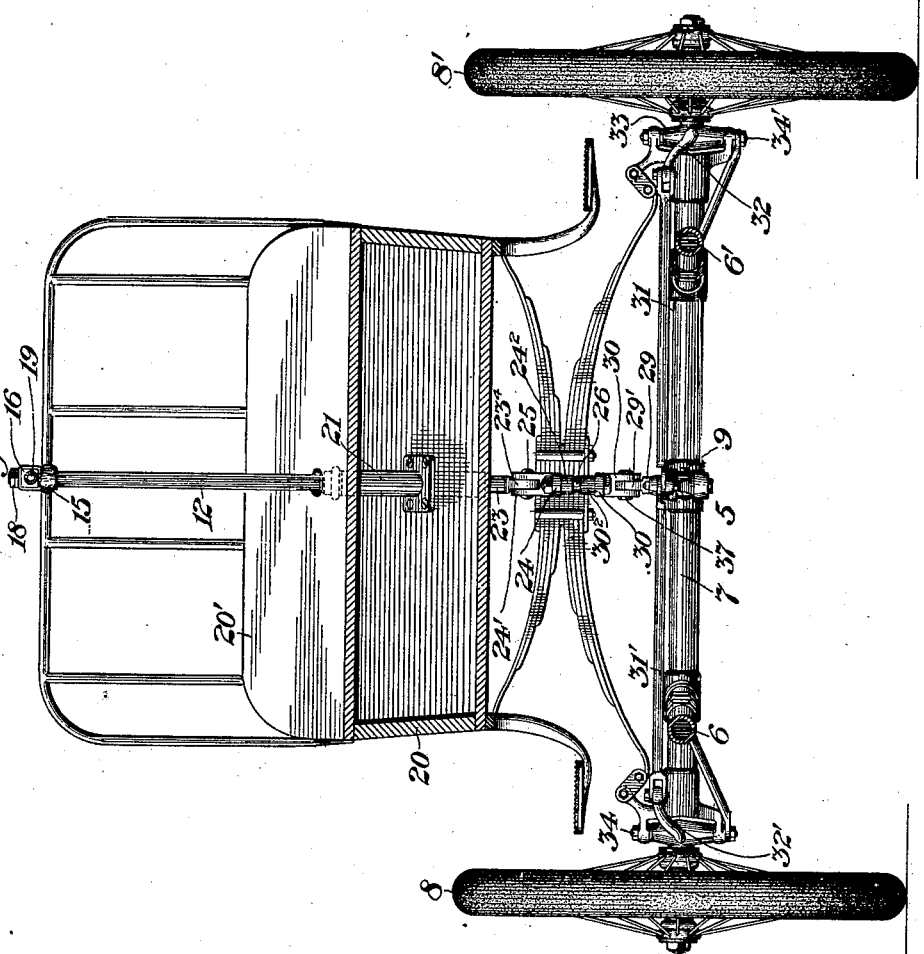
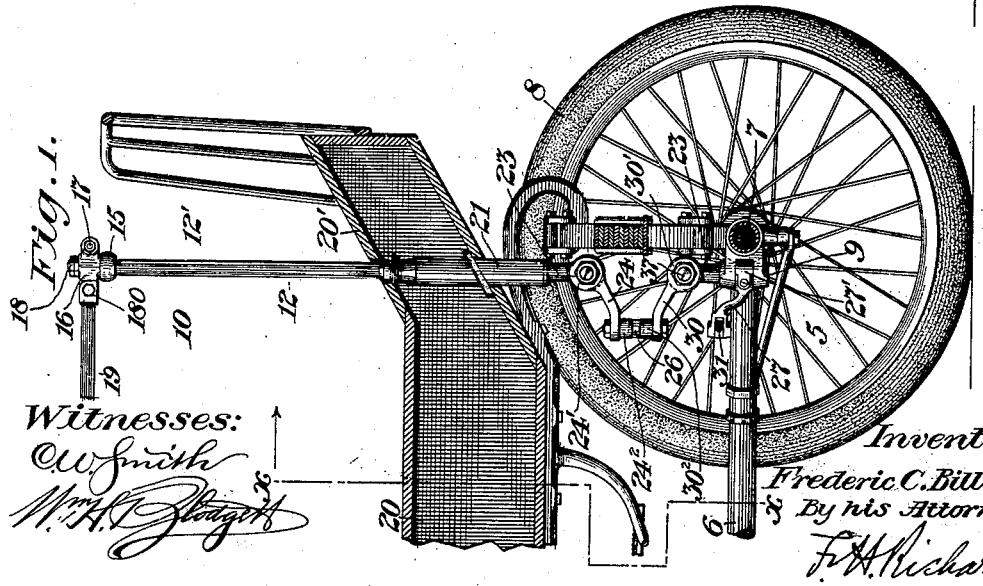
Witnesses:
O. W. Smith
Wm. H. Blodgett
Inventor:
Frederic C. Billings
By his Attorney
F. H. Richards.
THE NORRIS PETERS CO., PHOTO-LITHO., WASHINGTON, D. C.

No. 676,116. Patented June 11, 1901.
F. C. BILLINGS.
STEERING MECHANISM FOR VEHICLES.
(Application filed June 20, 1900.)
(No Model.) 2 Sheets—Sheet 2.
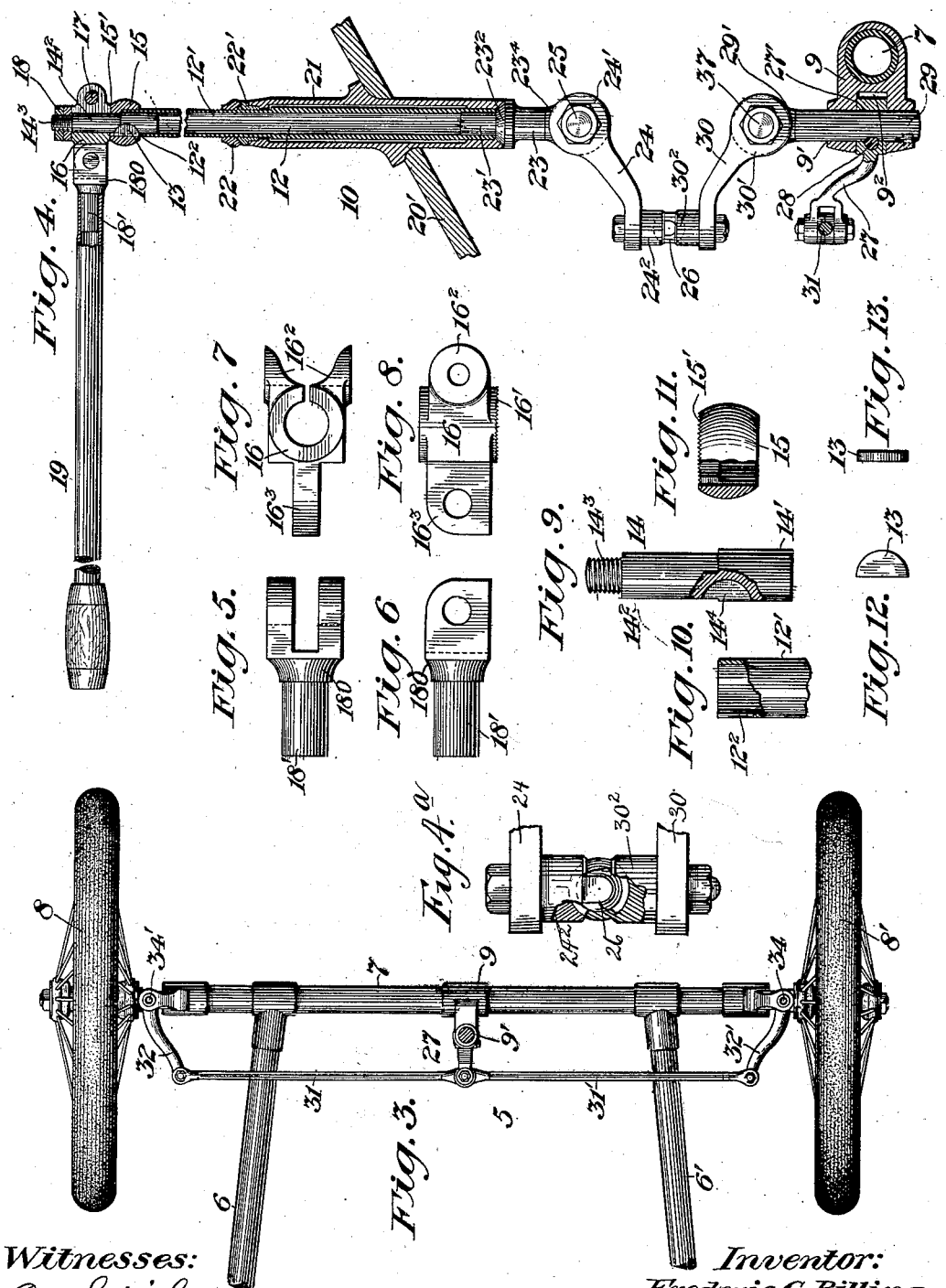
Witnesses:
C. W. Smith
W. H. Blodgett
Inventor:
Frederic C. Billings
By his Attorney,
F. H. Richards

UNITED STATES PATENT OFFICE.

FREDERIC C. BILLINGS, OF HARTFORD, CONNECTICUT, ASSIGNOR TO AMERICAN BICYCLE COMPANY, OF NEW YORK, N. Y., AND JERSEY CITY, NEW JERSEY.

STEERING MECHANISM FOR VEHICLES.

SPECIFICATION forming part of Letters Patent No. 676,116, dated June 11, 1901.

Application filed June 20, 1900. Serial No. 20,935. (No model.)

*To all whom it may concern:*

Be it known that I, FREDERIC C. BILLINGS, a citizen of the United States, residing in Hartford, in the county of Hartford and State of Connecticut, have invented certain new and useful Improvements in Steering Mechanism for Vehicles, of which the following is a specification.

One object of the invention is to provide an improved yielding connection between the manually-controlled lever and the steering-gear, whereby the parts controlled by said lever will always be kept in correct operative relation with each other notwithstanding the movement of the spring-supported body relative to the running-gear.

A further object of the invention is the provision of improved means for securing the steering-lever to the steering rod or shaft.

In the accompanying drawings, Figure 1 is a side elevation of the improved steering mechanism in place on a vehicle, a part of the body of said vehicle being shown in section and the steering-axle being cut on a line adjacent to one edge of the coupling thereon to which the sectional steering mechanism is secured. Fig. 2 is a section on line $x\,x$ of Fig. 1 looking in the direction of the arrow. Fig. 3 is a plan view of a part of the running-gear frame, showing the steering-axle, the steering-wheels pivoted to said axle, and the rods connected by links to said wheels. Fig. 4 is a longitudinal vertical section of my invention, partially in elevation, showing it in place on a part of the vehicle-body and as connected with the coupling secured to the steering-axle, the latter being in section. Fig. 4$^a$ is a detail view, on a larger scale, of the connection between the two parts of the steering mechanism. Figs. 5 and 6 are respectively enlarged plan and side views of a fork for receiving the shank of an eye secured to the steering-rod, the stem of said fork being fitted within the guiding-lever. Figs. 7 and 8 are respectively enlarged plan and side views of a split eye secured to the top of the steering-rod. Fig. 9 is an enlarged side view of a bolt, to the stem of which the eye shown in Figs. 7 and 8 is connected. Fig. 10 is an enlarged side elevation, partially in section, of the upper part of the tubular steering-rod into which the end of the bolt shown in Fig. 9 is to be inserted. Fig. 11 is an enlarged side elevation, partially in section, of a thimble to be fitted on the upper end of the steering-rod; and Figs. 12 and 13 are respectively side and edge views of a Woodruff key employed in securing the parts shown in Figs. 9 and 11 to the steering-rod.

Referring to the drawings, the numeral 5 designates in a general way part of the running-gear frame of a motor-vehicle, which may be of any conventional construction and is in the construction shown composed of side bars or reaches 6 6', a support (not shown) for the rear axle, and a forward cross-bar or steering-axle 7, to which the usual steering-wheels 8 8' are pivoted in a well-known manner. Attached to the steering-axle 7, at or about the middle thereof, is an eye or coupling 9, perforated at 9' and slotted at 9$^2$, for a purpose hereinafter described.

The numeral 10 designates in a general way my improved steering mechanism, which in the construction illustrated is composed of a tubular steering-rod 12, reduced at 12', (see Fig. 4,) externally threaded on such reduced portion, and provided with a short kerf or slot 12$^2$ for the reception of a Woodruff or other form of key 13. Inserted in the upper end of this steering-rod is a bolt 14, having an enlarged body portion 14', a reduced shank 14$^2$, and a reduced externally-threaded end 14$^3$, said bolt being grooved at 14$^4$ to receive the key 13, by which the bolt is secured to the steering-rod. Fitted over the upper end of the steering-rod and surrounding the bolt 14 and key 13 is a ring or thimble 15, having a serrated upper surface 15', said ring serving to hold the key in place, and thereby to unite the bolt 14 to the rod 12. Sleeved upon the reduced portion 14$^2$ of bolt 14 is a split eyepiece 16, having teeth or serrations 16' in engagement with the toothed surface 15' of the ring 15, said eyepiece having perforated ears 16$^2$, through which a screw 17 is passed, said screw serving to tighten the eye upon the bolt. Nuts 18 are employed for securing the eyepiece to the bolt and forcing the serrated surfaces 15' and 16' into contact, and at one side said eyepiece is provided with a perforated extension 16³, over which are fitted the perforated arms of a fork 18⁰, having a shank 18' fitted in a tubular handle or guiding-lever 19, as shown in Fig. 4.

By the construction described the steering-handle may be removed whenever it is desirable, while the engagement with the rod is secure and not liable to accidental release. Furthermore, the position of the lever or handle with respect to the steering-rod may be adjusted readily to the angle desired, all that is necessary being to loosen the bolt 17 and the nuts 18, swing the handle to the position desired, and then retighten said bolt and nuts. While the parts 15' 16' are shown serrated for the purpose of affording a better holding-surface, yet they may be roughened in other ways or provided with other forms of teeth without departure from my invention.

The numeral 20 designates the body of the vehicle, and 20' the foot-board of said body, through which the steering-rod passes. Located in this foot-board portion 20' is a sleeve 21, through which the steering-rod 12 passes and in which said rod may be turned by the lever 19, a nut and washer 22 22' being employed at the top of sleeve 21, and the nut engaging with an external thread upon the reduced portion of the steering-rod and serving to hold the parts in place, as shown in Fig. 4. Tightly fitted within the lower end of the tubular steering-rod is the tenoned portion 23' of a bolt 23, said bolt having an enlarged body portion which is beveled or chamfered at 23² to fit the correspondingly-formed lower part of the sleeve 21, and at its opposite end this bolt is formed with a perforated flattened head 23⁴ for a purpose hereinafter described. Mounted for swinging movement on the bolt 23 is an arm or lever 24, having a perforated fork 24' at one end, through which passes a pivot-bolt 25 for securing said arm or lever to the flattened head of the bolt 23, and at its free extremity said arm or lever is provided with a depending cup-shaped portion or socket 24² for the reception of a ball or roller 26. Fitted in the slot 9² of the coupling 9, secured to the steering-axle and passing through an eye 27' of a lever 27 for actuating the steering-linkage, (to which eye it is secured by a key 28,) is a bolt 29, having a perforated flattened portion 29' at its upper end, which is inserted between the perforated ears 30' of an arm or lever 30, having a cup-shaped socket at its free end for the reception of ball or roller 26, a bolt 37 being employed for uniting said parts so that they may freely swing upon each other.

Articulated to the lever 27 may be any desired kind of steering-linkage, that shown being composed of rods 31 31', pivoted at their free ends to arms 32 32', connected to the sleeves 33 33', projecting from which are stub-axles to support the steering-wheels 8 8'.

Bolts 34 34' pass through said sleeves and serve to connect them to the forward axle 7 in a well-known manner, so that said wheels will be under direct and easy control of the steering-rod and its connections above described.

If it is desired to cause the vehicle to swerve to the right, the operator pushes the guiding handle or lever 19 toward the left, and if it is desired to have the vehicle swerve to the left the lever is pushed toward the right. In either action the steering-rod 10 will be turned and through the connections described will cause the steering-wheels to guide the vehicle in the desired direction.

Should the steering-wheels meet and pass over an obstruction or into a rut or other depression in the roadway, thereby causing either a jolt or a lateral motion of the vehicle-body, the steering-rod and its attached lever will not be affected, for the arms 24 30 will swing on their pivots 25 and 37, and should the vehicle be thrown to an inclined position or the box or body thereof be moved laterally these movements will be permitted by the ball-and-socket connection 26 24² 30² specified without affecting the position of the steering-handle and without wrenching the same forcibly from the grasp of the operator, as sometimes happens in the old constructions, where the steering-rod is rigidly connected with the steering-linkage of the vehicle.

Many of the details of my invention may be widely modified without departure therefrom, and the invention is not limited to the precise devices shown.

Having described my invention, I claim—

1. In a vehicle, the combination with independent steering-wheels, and steering-linkage, of sectional steering mechanism including a pivoted lever as a part of each section, a universal joint located between said levers, and means for connecting said mechanism to the steering-linkage.

2. In a vehicle, the combination with independent steering-wheels and steering-linkage connected to said wheels, of a rotatable steering-rod mounted on the body of the vehicle, a lever pivoted on the lower end of said rod, a rotatable bolt mounted on the running-frame and connected to the steering-linkage, a lever pivoted on the upper end of said bolt, and a universal joint between the free ends of said levers.

3. In a vehicle, the combination of independent steering-wheels, steering-linkage articulated to the steering-wheels, a steering-rod mounted on the body of the vehicle, a steering-handle connected to the steering-rod, a lever pivotally connected to said rod, a bearing attached to the steering-axle, a bolt mounted in said bearing, a lever pivoted to said bolt, a ball-and-socket joint between the two levers, and a lever connected to said bolt and articulated to the steering-linkage.

4. In a vehicle, the combination with the steering-rod of a thimble having a roughened surface, a bolt having a key passing through a slot in the steering-rod and held in place by the thimble, and a steering-handle mounted on said bolt and held against said thimble.

5. In a vehicle, the combination with a steering-rod, of a bolt secured to said rod, a fork attached to the bolt, and a steering-handle pivoted to the fork.

6. In a vehicle, the combination with a steering-rod, of a bolt secured to said rod, a split eyepiece attached to the bolt, a fork pivoted to the eyepiece and a steering-handle attached to the stem of the fork.

7. In a vehicle, the combination with a steering-rod of a steering-handle pivoted to a split eyepiece connected to the steering-rod, a bolt for securing said eyepiece in place, and a threaded connection for attaching the eyepiece to the steering-rod.

8. In a vehicle, the combination with a steering-rod, of a bolt splined to said rod and supporting a roughened surface, a steering-handle engaging said bolt and having a roughened surface to coöperate with the first-mentioned roughened surface, and means carried by the bolt for forcing said roughened surfaces into contact.

9. In a vehicle, the combination with the body thereof, of a sleeve mounted in an opening of the foot-board of said body, a steering-rod having an exteriorly-threaded section fitted in said sleeve, a nut fitted on the threaded portion of said rod, a washer fitted in the upper part of the sleeve and against which the nut bears, yielding connection between the steering-rod and the steering-linkage, steering-linkage connected to one of said yielding connections, and a steering-handle secured to the steering-rod.

10. In a vehicle, the combination with a tubular steering-rod, and with means for actuating the same, of an eyebolt having a tenoned portion fitted in the lower end of said rod, a lever swiveled to said eyebolt and having a socket, a ball fitted in said socket, a second lever having a socket also fitted over the ball or roller, an eyebolt to which the last-named lever is swiveled, a coupling on the steering-axle for receiving the stem of said eyebolt, an arm keyed to said eyebolt, and steering-linkage connected to said lever.

FREDERIC C. BILLINGS.

Witnesses:
F. C. BLAND,
H. B. BELFIELD.